United States Patent [19]

Dunn et al.

[11] 4,274,572
[45] Jun. 23, 1981

[54] APPARATUS FOR SEVERING AN OPTICAL FIBER

[75] Inventors: William M. Dunn, Philadelphia, Pa.; Malcolm H. Hodge, Claymont, Del.

[73] Assignee: TRW Inc., Philadelphia, Pa.

[21] Appl. No.: 112,514

[22] Filed: Jan. 16, 1980

[51] Int. Cl.³ .......................... B26F 3/00; C03B 33/06
[52] U.S. Cl. .................................. 225/96.5; 225/101; 225/105
[58] Field of Search ............... 225/96.5, 96, 101, 105, 225/2; 65/DIG. 7

[56] References Cited

U.S. PATENT DOCUMENTS

| | | | |
|---|---|---|---|
| 3,934,773 | 1/1976 | Chinnock et al. | 225/2 |
| 4,017,013 | 4/1977 | Hawk et al. | 225/96.5 |
| 4,036,419 | 7/1977 | Hensel et al. | 225/96.5 |
| 4,074,840 | 2/1978 | Fulenwider et al. | 225/96.5 |
| 4,154,385 | 5/1979 | Lewis | 225/96.5 |
| 4,159,793 | 7/1979 | Belmonte et al. | 225/96.5 |
| 4,168,026 | 9/1979 | Lukas et al. | 225/96.5 |
| 4,202,475 | 5/1980 | Hirai et al. | 225/2 |

OTHER PUBLICATIONS

"Handheld Tool to Cut & Prepare Fiber-Optic Waveguide Ends", E. Bossi et al.; IBM Bulletin vol. 21, No. 4, Sep. 1978.

"Fibers-Simple Testing Methods Give Users a Feel for Cable Parameters", R. B. Cheser et al.; Electronics, Aug. 5, 1976, pp. 90-92.

Primary Examiner—Frank T. Yost
Attorney, Agent, or Firm—Dann, Dorfman, Herrell & Skillman

[57] ABSTRACT

An apparatus for consistently severing an optical fiber to a precise predetermined length required for use in a connector assembly comprising axially-aligned and spaced-apart first and second clamp means for holding the optical fiber being severed. Means is provided for axially displacing the clamp means relative to each other and for placing the optical fiber under axial tension. A first scoring means intermediate the respective clamp means at a given predetermined distance from the first clamp means is provided for scoring or scribing the optical fiber while it is subjected to the axial tension to produce a break therein at the given predetermined distance from the first clamp means. A second scoring means may also be provided intermediate the respective clamp means at a different predetermined distance from the first clamp means for alternatively producing a break in an optical fiber at a different predetermined distance from the first clamp means.

10 Claims, 10 Drawing Figures

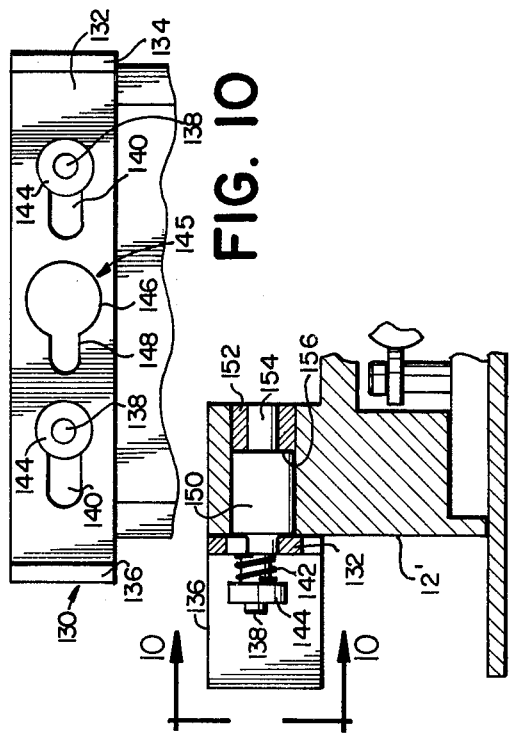
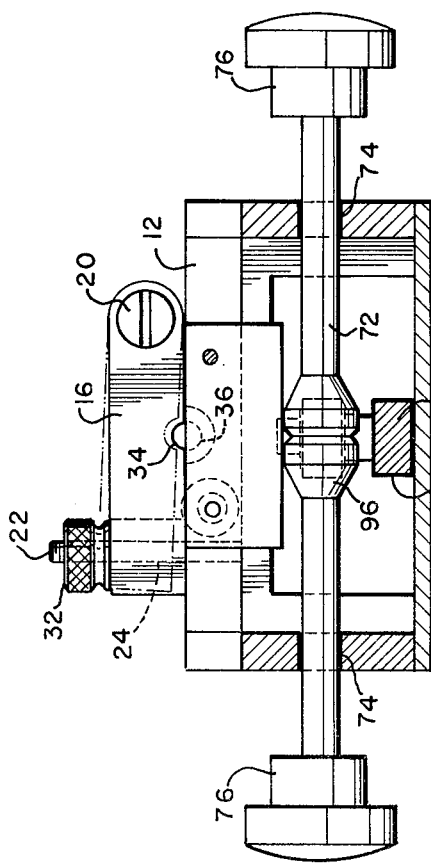
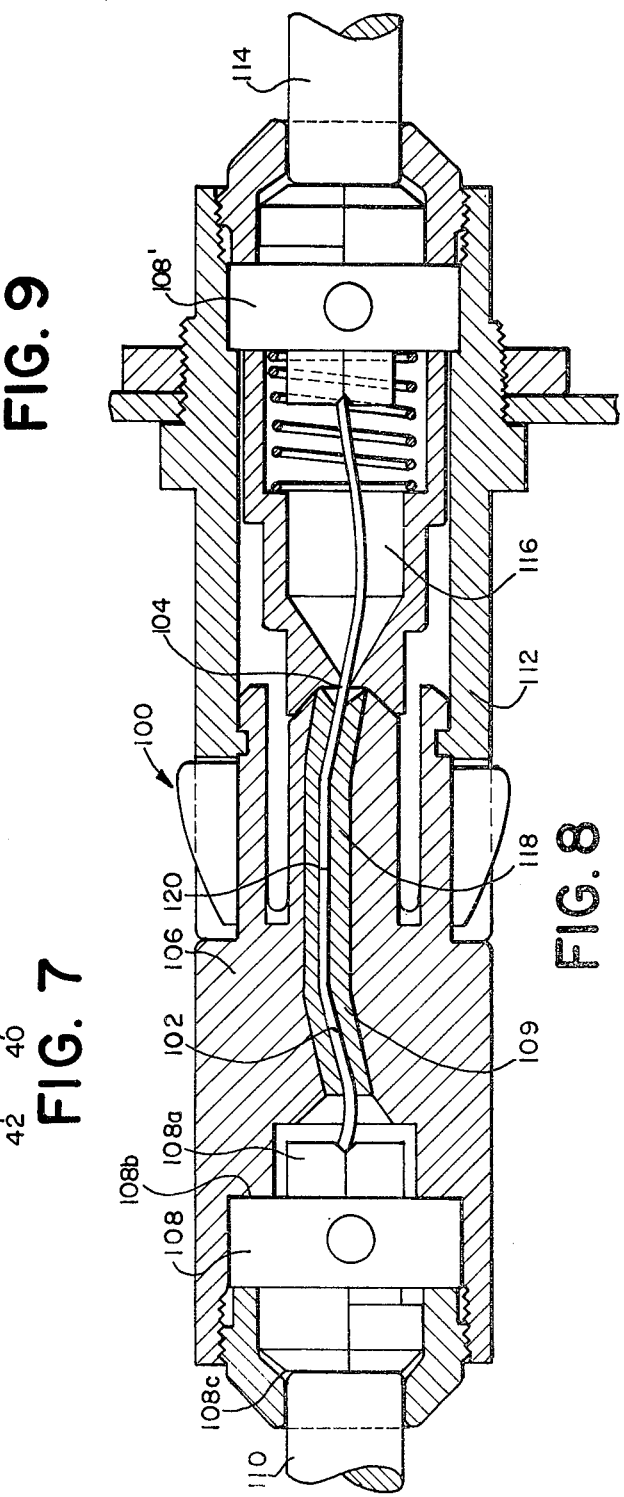

APPARATUS FOR SEVERING AN OPTICAL FIBER

BACKGROUND OF THE INVENTION

This invention relates generally to optical fiber severing devices and, more particularly, to an optical fiber severing apparatus which consistently provides optical fiber ends of the precise determined lengths and having the flat, perpendicular fiber end surfaces necessary for low-loss coupling in a fiber optic connector.

DESCRIPTION OF THE PRIOR ART

The recent development of low-loss high-quality fiber optic cable has clearly demonstrated the feasibility of the utilization of optical systems as a medium for the transmission of high volume communications signals. However, a major impediment to the widespread use of fiber optic cable for such communications purposes has been the development of low-loss splicing and coupling techniques for the joining and repair of fiber optic cables under field conditions.

It is well known that in order to provide a low-loss fiber optic joint it is necessary to cut or sever the optic fiber so that the fiber ends which are to be joined together are smooth, flat and perpendicular to the fiber axis. The conventional method of obtaining such high quality fiber ends involves bending the optical fiber to a particular radius, subjecting the fiber to axial tension and lightly scoring or scribing the surface of the fiber to produce a crack which then propogates transversely through the optical fiber to provide the desired clean perpendicular break.

Although the conventional prior art method of obtaining high quality optical fiber ends has been successfully employed in conjunction with various tools for use under field conditions, for the most part these prior art tools are relatively sophisticated and should only be utilized by a relatively highly skilled operator. In addition, these prior art tools merely operate to break or sever the fiber without regard to the particular length requirements of any connecting device which may subsequently be employed to join together the resulting fiber ends. Thus, if the particular connecting device being used to join the optical fiber ends requires fibers having a specific length, the length must be determined empirically on an individual basis, thereby possibly resulting in a lack of uniformity in the connection of the fibers.

SUMMARY OF THE INVENTION

With the forgoing in mind, the present invention provides an apparatus for consistently severing optical fibers to the precise lengths required for use in a given fiber optic connector.

The preferred embodiment of the present invention provides such an apparatus which consistently severs optical fibers to either of two precise lengths as required for opposing ends of a given fiber optic connector, and which is inexpensive to construct and relatively simple to operate under field conditions.

Briefly stated, the present invention provides an apparatus for severing an optical fiber for use in a connector assembly which has components for retaining the two optical fiber ends against axial displacement. The severing apparatus comprises a first clamp means having an abutment for positioning a connector assembly component with the optical fiber projecting axially therefrom. A second clamp means for clamping the free end of the projecting optical fiber is spaced apart from the first clamp means and is axially aligned with the connector assembly component when the component is positioned in the first clamp means. The spacing between the two clamps means provides a free unimpeded space to permit the optical fiber to span in a straight axial path between the two clamp means. Means is provided for mounting the first and second clamp means for relative axial displacement between closed and extended positions. A bias means urges the clamp means toward the extended position to thereby apply axial tension to the optical fiber. A first scoring means is disposed between the clamp means at a first predetermined distance from the first clamp means. The first scoring means is adapted to score the optical fiber while it is under axial tension in order to produce a break in the optical fiber at the first predetermined distance from the first clamp means. A second alternative scoring means disposed between the clamp means at a second predetermined distance from the first clamp means may also be provided for alternatively scoring the axially tensioned optical fiber to produce a break therein at the second predetermined distance from the first clamp means.

BRIEF DESCRIPTION OF THE DRAWINGS

The foregoing summary as well as the following detailed description of a preferred embodiment of the present invention will be better understood when read in conjunction with the accompanying drawings, in which:

FIG. 7 is a sectional view of the apparatus of FIG. 1 taken along lines 7—7;

FIG. 8 is an enlarged sectional view of a connector assembly for coupling together optical fibers severed by the apparatus of FIG. 1;

FIG. 9 is a fragmentary sectional view of an alternate embodiment of the present invention; and FIG. 10 is a fragmentary end elevational view of a portion of the apparatus of FIG. 9 as seen from the line 10—10.

DESCRIPTION OF A PREFERRED EMBODIMENT

Figure 1:
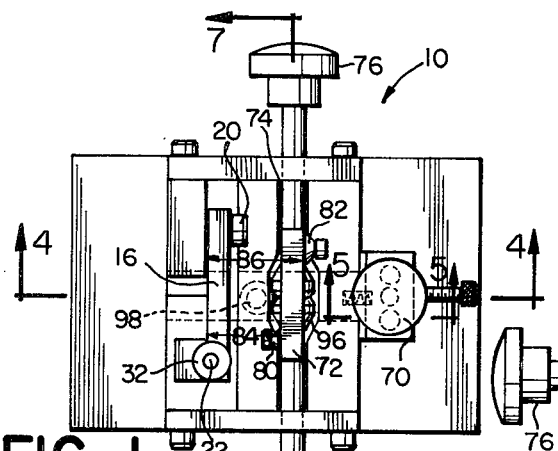
FIG. 1 is a plan view of a preferred embodiment of the present invention.

Referring to the drawings and particularly to FIG. 1, in accordance with the present invention an apparatus, designated generally as 10, is provided for severing optical fiber ends to consistently provide fiber ends of the precise predetermined lengths and having the smooth, flat, perpendicular end surfaces necessary for low-loss coupling in a fiber optic connector assembly. This embodiment of the present invention is particularly adapted to provide the precise optical fiber lengths required for the specific fiber optic connector assembly 100 shown in FIG. 8. A detailed explanation of the construction and operation of this connector 100 is not believed to be required for a complete understanding of the present invention but can be found in U.S. patent application Ser. No. 943,470 entitled Connector Construction (incorporated herein by reference) and assigned to TRW, Inc., the assignee of the present invention. Briefly, however, the connector 100 is employed to couple or join together two optical fibers 102 and 104 to form a low-loss optical connection or joint. As is well known in the art, the best low-loss fiber optical joints are formed by axially abutting two perfectly aligned optical fibers having end surfaces which are smooth, flat and perpendicular to the fiber axis. The connector 100 comprises a male or plug member 106 which includes a component for example, an internal scissor type connector assembly cable clamp 108, for clamping the fiber optic cable 110 and the optical fiber 102 against axial displacement therein. The optical fiber 102 extends beyond the cable clamp 108 along a curved path within sleeve 109 into the interior of the plug 106 by a first precise distance.

A female or receptacle member 112 of the connector 100 also includes a cable clamp component 108' which is identical to the component 108 for clamping a second fiber optic cable 114 and the optical fiber 104 against axial displacement therein. The optical fiber 104 extends beyond the cable clamp 108' into the interior of the receptacle 112 along a curved path through a cavity 116 and a within sleeve 118 by a second precise distance.

As is clearly shown in FIG. 8, when the plug 106 and receptacle 112 are properly united as described in detail in the aforesaid U.S. patent application, the ends of the optical fibers 102 and 104 abut each other within the connector 100 at 120 to form the desired low loss optical connection. Obviously, the precise lengths of the optical fibers 102 and 104 respectively, are critical since if either of the optical fibers 102 and 104 is too long or too short, the fiber ends may not properly abut each other as required for the formation of the low-loss optical connection. The optical fiber severing apparatus 10 constructed in accordance with the present invention consistently cuts or severs optical fibers to either of the precise required lengths with end surfaces which are smooth, flat and perpendicular.

Referring now to FIGS. 1-7, there is depicted the optical fiber severing apparatus 10 which includes an irregularly shaped housing or base member 12. Fixidly disposed at a first longitudinal side of the base member 12, in this embodiment the left side as viewed on FIG. 1, is a first clamp means or lever clamp for positioning the connector cable clamp 108. As used herein longitudinal shall mean from side to side and lateral shall mean from top to bottom as viewed on FIG. 1.

Figure 2:
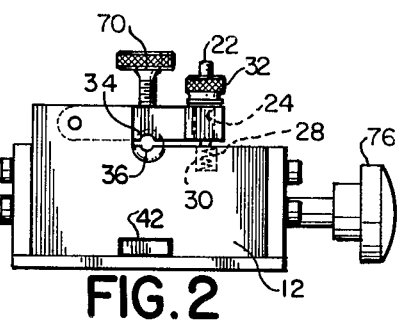
FIG. 2 is a left side elevation view of the apparatus depicted in FIG. 1.

As is best seen in FIGS. 2 and 7, the lever clamp is comprised of a lever arm 16 having a first end pivotally attached to the base member 12 by, for example, a screw 20. A threaded rod 22 which is anchored at one end in the base member 12, extends upwardly through a slightly larger unthreaded opening 24 in the other end of the lever arm 16. A small coil spring 28 partially enclosed within an annular recess 30 (FIG. 2) within the base member 12 surrounds the rod 22. The spring 28 is under compression and engages the bottom of the lever arm 16, to urge the lever arm 16 toward an upward or open position as is shown in phantom on FIG. 7. A finger-adjustable nut 32 threaded onto the end of the threaded rod 22 engages the top of lever arm end as shown on FIG. 7 to prevent the lever arm 16 from pivoting any further than as is depicted in phantom under the bias or urging of the spring 28. For purposes which will hereinafter become apparent, the nut 32 may be rotated in a clockwise or tightening direction, thereby causing the lever arm 16 to pivot in a counter clockwise direction about the attaching screw 20 and consequently moving the lever arm end downwardly against the urging of the spring 28 to a downward or closed position as is shown in the solid lines on FIG. 7.

A semi-circular opening or notch 34 is formed within the lever arm 16 at a point approximately midway between the lever arm ends. A similar semi-circular opening or notch 36 is formed at a corresponding position within the base member 12 so that the two aligned semi-circular notches 34 and 36 cooperate to form an opening when the lever arm 16 is in a closed position. The diameter of the opening is slightly less than the actual outer diameter of the reduced end portion 108a of the connector cable clamp 108.

To position a connector cable clamp 108 within the lever clamp the adjustable nut 32 is turned in a counterclockwise direction, thereby allowing the spring 28 to urge the lever arm 16 to an open position as shown in phantom on FIG. 7. Next, the connector cable clamp 108 with the optical fiber 102 projecting therefrom is inserted, fiber end first, from the left side of the apparatus 10 between the notches 34 and 36 until the annular shoulder 108b of the connector cable clamp 108 abuts against the left side of the lever arm 16 and the base member 12. For proper determination of the fiber length, it is essential that the annular shoulder 108b be properly abutted against the lever arm 16 and the base member 12 since the length of the optical fiber remaining after severing depends upon accurate seating of the component 108 in the severing device. Next, the adjustable nut 32 is tightened, thereby moving the lever arm 16 against the bias of the spring 28 toward the closed position. When the lever arm 16 is fully closed, the opening is slightly less than the diameter of the connector cable clamp fiber end portion 108a, so that the clamp component 108 is tightly retained in position by the lever clamp with the optical fiber projecting freely and unimpededly to the right across the base member 12.

Referring now to FIGS. 3, 4, 5 and 6, a first elongated member 40, having a generally rectangular lateral cross-section (see FIG. 7) is disposed for longitudinal slidable movement within a suitably sized generally rectangular guideway or slot 42 in the base member 12. At the right longitudinal end of the slidable member 40 a second clamp means, or optical fiber clamp is provided to clamp an optical fiber extending rightwardly from the lever clamp. The fiber clamp is disposed in axial alignment with the lever clamp so that an optical fiber may span longitudinally in a straight unimpeded path from the lever clamp to the fiber clamp.

The fiber clamp comprises a first vertically oriented block-like support member 46 for supporting the optical fiber. The support member 46 is generally rectangular in cross section and is attached, by any suitable means, for example, a machine screw 48, to the slidable member 40 for longitudinal movement therewith.

Figure 3:
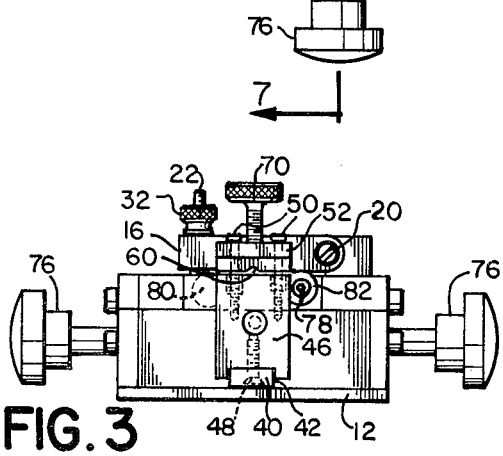
FIG. 3 is a right side elevation view of the apparatus depicted in FIG. 1.
Figure 5:
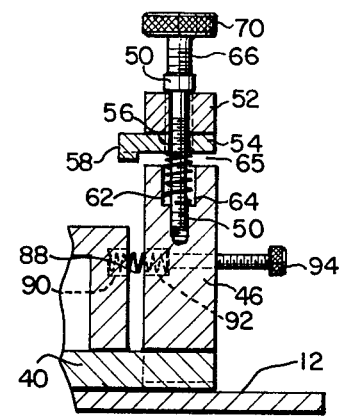
FIG. 5 is a sectional view of a portion of the apparatus of FIG. 1 taken along lines 5—5.
Figure 6:
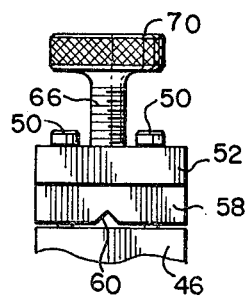
FIG. 6 is a fragmentary view as seen from the line 6—6 of FIG. 5.

A pair of cap screws 50 are anchored in the top of the support member 46. A generally flat retaining member 52 having a generally rectangular cross-section is mounted in spaced relation to the support member 46 by the cap screws 50. A generally flat clamping member 54 having a pair of openings 56 axially aligned with but slightly larger in diameter than the cap screws 50, is disposed for vertical movement along the screws 50 between the members 46 and 52. The left side of the clamping member 54, confronting the lever clamp, includes a downwardly extending lip 58 having a V-shaped notch or guide groove 60 disposed therein (See FIG. 6). A pair of compressed coil springs 62 surround the cap screws 50 and are partially housed within a pair of annular recesses 64 within the support member 46. The springs 62 act to urge the clamp member 54 upwardly against the bottom of the retaining member 52 to provide an opening 65 therebetween as is shown in FIGS. 3 and 5.

An adjustment screw 66 is disposed within a threaded opening in the retaining member 52. The adjustment screw 66 includes an operator-knob 70 to facilitate hand rotation. By rotating the adjustment screw 66 in a clockwise direction, the screw 66 moves downwardly within the threaded retaining member opening until the bottom end of the screw 66 contacts the top of the clamping member 54. Further clockwise, rotation of the adjustable screw 66 causes the clamping member 54 to move downwardly against the bias of the springs 62 along the cap screws 50 as shown in FIG. 4.

To clamp an optical fiber projecting rightwardly across the base member 12 from the lever clamp, the adjustable screw 66 is first turned or rotated in a counter clockwise direction until the clamping member 54 moves upwardly under the bias of the spring 62 to contact the bottom of the retaining member 52. Next the extending optical fiber is inserted through the guiding V-groove 60 and into the opening 65 between the bottom of the clamping member 54 and the top of the support member 46. The adjustable screw 66 is then turned in the clockwise direction, forcing the clamping member 54 downwardly to contact and tightly hold the optical fiber between the members 54 and 46. As will hereinafter become apparent, the optical fiber will be severed at a point between the lever clamp and the fiber clamp, and the portion of the optical fiber retained in the fiber clamp will be discarded. Therefore, the projecting optical fiber may be held or clamped as tightly as necessary within the fiber clamp without worrying about possible damage to the usable optical fiber since the portion to be used does not contact the fiber clamp.

Figure 4:
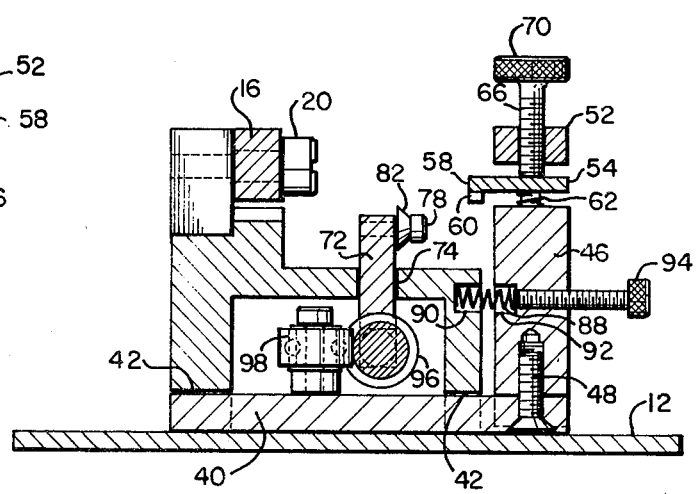
FIG. 4 is a sectional, view of the apparatus of FIG. 1 taken along lines 4—4.

Referring now to FIGS. 1, 4 and 7, there is shown a second elongated member 72 disposed for lateral slidable movement within a suitable guideway or slot 74 within the base member 12. As shown in FIG. 4, the top of the member 72 is below the plane extending between the tops of the support member 46 and the base member 12 thereby provide the unimpeded span of the optical fiber. As shown in FIGS. 1 and 7, portions of the laterally slidable member 72 extend laterally outside of the base member 12 and include operating knobs 76 attached to the ends thereof.

Secured to the top of the laterally slidable member 72 by any suitable means, for example, screws 78, are first and second scoring means 80 and 82 respectively. In the preferred embodiment shown in the drawings, the scoring means 80 and 82 are comprised of disk shaped diamond or carbide cutters which are used to score or scribe the optical fiber to initiate therein a lateral fracture which subsequently propogates therethrough to produce the desired clean break. The height of the cutters 80 and 82 is such that they properly scribe an optical fiber which is retained within the lever clamp and the fiber clamp. In the present instance, the cutters project above the level of the top of the member 72 to intersect the path of the span of the optical fiber by a distance of 1/32 inches. As shown in FIG. 1, cutters 80 and 82 are positioned on opposite transverse sides of the optical fiber path. Thus, when the elongated member 72 is slid in a first transverse direction (upwardly on FIG. 1) cutter 80 contacts and scribes the optical fiber spanning between the lever clamp and the fiber clamp at that time, and when the elongated member 72 is slid in the opposite transverse direction (downwardly on FIG. 1) cutter 82 contacts and scribes the optical fiber spanning between the lever clamp and the fiber clamp at that time.

As shown in FIG. 1, cutter 80 is positioned at a first predetermined longitudinal distance 84 from the outside or left side of the lever clamp. As was described above, the left side of the lever clamp provides an abutment for axially positioning the connector cable clamp 108 with the optical fiber extending rightwardly therefrom. The predetermined distance 84 is of such a length that the remaining portion of an optical fiber severed utilizing cutter 80 as a scribe or scoring means is the precise length required for use in conjunction with the connector plug member 106 as shown in FIG. 8. Likewise, cutter 82 is positioned at a second predetermined longitudinal distance 86 from the left side of the lever clamp. The second predetermined distance 86 is of such a length that the remaining portion of an optical fiber severed utilizing cutter 82 as a scribe or scoring means is the precise length required for use in conjunction with the connector receptical member 112. In this manner it is possible to sever an optical fiber at either of the precise lengths required for the connector 100 utilizing a single tool.

As was discussed above, in order to properly sever an optical fiber it must be scored while under an axial tension. In the present apparatus, an axial tension is applied to a clamped optical fiber by a bias means, for example, a compressed spring 88 (see FIGS. 4 and 5) located within recesses 90 and 92 of the base member 12 and the fiber clamp support member 46 respectively. The spring 88 urges the fiber clamp support member 46 (and the elongated longitudinally slidable member 40) toward the right, away from the lever clamp and the base member 12. By displacing the fiber clamp support member 46 away from the lever clamp, axial tension is applied to any optical fiber which is retained within the lever clamp and the fiber clamp. The amount of tension which is applied to optical fibers of varying size may be varied by means of an adjustment screw 94. By turning the adjustment screw 94 in a clockwise direction, the compression of the spring 88 (and likewise the tension on the optical fiber) is increased. By turning the adjustment screw 94 in a counter-clockwise direction, the compression of the spring 88 is decreased. (Obviously, larger diameter optical fibers require higher axial tension). A precise setting for the adjustment screw 94 (and thus a resulting precise axial tension) may be determined for each diameter optical fiber which may be severed utilizing the apparatus.

Referring now to FIGS. 1, 4 and 7, a cam surface 96 on the laterally slidable member 72 engages a generally circular cam follower 98 which is attached to the longitudinally slidable member 40. The cam surface 96 and cam follower 98 interact to control the rightward movement of the longitudinally slidable member 40 (and thus the fiber clamp) under the urging of the fiber tensioning spring 88. When the cam surface 96 is centered on the cam follower 98 as shown in FIG. 1, the longitudinally slidable member 40 is in an initial (leftmost) position. The optical fiber is clamped within the fiber clamp when the longitudinally slidable member 40 is in the initial position as shown. Subsequent movement of the laterally slidable member 72 as described above for scoring the optical fiber (in either direction) also moves the cam surface 96 off center from the cam follower 98, thereby allowing the longitudinally slidable member 40 to move rightwardly under the urging of the fiber tensioning spring 88. As was discussed above, the distance which the longitudinally slidable member 40 moves and thus the axial tension imposed upon the optical fiber is determined by the setting of the adjustment screw 94, depending upon the size of the optical fiber being severed.

In the operation of the severing apparatus 10 a suitable optical fiber cable having a connector cable clamp 108 installed on the end thereof with a suitable length of optical fiber extending therefrom is first inserted into the lever clamp in the manner described above. The laterally slidable member 72 is positioned so that the cam surface 96 is centered on the cam follower 98 thereby establishing the longitudinally slidable member 40 in its initial position. The optical fiber extending from the right side of the lever clamp is then inserted into and tightly clamped by the fiber clamp in the manner described above. The adjustment screw 94 is adjusted to determine the proper axial tension to be placed upon the span of the optical fiber being severed. The laterally slidable member 72 is then moved in either direction, thereby in a single continuous motion moving the cam surface 96 off the center of the cam follower 98 to impose the predetermined axial tension upon the optical fiber and to score or scribe the optical fiber by one of the cutters 80 and 82. Displacement of a cutter 80 or 82 into the path of the optical fiber imposed an upward force on the fiber tending to deflect it by the distance by which the cutter projects above the level of the span. Passage of the cutter beyond the span relieves this upward force. Operation of the device in this manner has been found to produce a clean and perpendicular fracture of the fiber. As described above, cutter 80 is used if the optical fiber being severed is installed in the component 108 of the plug 106 and cutter 82 is used if the optical fiber being severed is installed in the component 108' of the receptacle 112.

When the optical fiber is scored or scribed under the axial tension by either of the cutters 80 and 82 under the axial tension, it breaks as described above to provide a clean smooth perpendicular end surface for use in the connector 100. The portion of the severed optical fiber which is retained within the fiber clamp may be removed and discarded. The retained optical fiber may be removed from the lever clamp and utilized in the appropriate component of the connector 100. It should be appreciated that the retained portion of the optical fiber has not been contacted by the apparatus; therefore, no damage such as scratching or nicking is inflicted upon the useful portion of the optical fiber.

Alternate Embodiment

A portion of an alternate embodiment of the present invention is depicted in FIGS. 9 and 10. The primary difference between the above-discussed embodiment and the alternate embodiment is that the lever clamp has been replaced by a sliding cable lock shown generally as 130. The same reference numerals with the addition of primes are used to designate to corresponding parts.

The sliding cable lock 130 comprises a generally flat lock plate 132 having outwardly extending end portions 134 and 136 which serve as handles or operators. A pair of threaded rods 138 extend respectively through a pair of suitably sized oval guideway openings 140 in the lock plate 132 to allow for lateral slidable movement of the lock plate 132 on the rods 138. A compressed coil spring 142 surrounds each of the threaded rods 138. The springs 142 are retained in place by a nut 144 on the end of each of the threaded rods 138. The compressed springs 142 engage the lock plate 132, urging it to the right to hold it in place against the base member 12'. For purposes which will hereinafter become apparent, the lock plate 132 also includes an irregularly shaped keyhole opening 145 comprised essentially of a circular opening 146 and a slot 148. The circular opening 146 is slightly larger than the outer diameter of the connector cable clamp 108. The slot 148 has a width slightly larger than the outer diameter of the fiber optic cable 110, but less than the diameter of the cable clamp 108.

Referring now to FIG. 9, the base member 12' includes an annular opening 150 extending longitudinally therethrough. The diameter of the base member opening 150 is slightly larger than the outer diameter of the connector cable clamp 108. Disposed within the right end of the base member opening 150 is a threaded sleeve 152 having an opening 154 which is slightly smaller than the outer diameter of the connector cable clamp fiber end portion 108a. The left edge of the sleeve provides an annular shoulder 156. The annular shoulder 156 is at the same longitudinal distance from the cutters (not shown) and serves the same purpose as was the left side of the lever clamp of the previously-described embodiment. The length of the opening 150 between the annular shoulder 156 and the lock plate 132 is generally the same as the length of the connector cable clamp 108 from the annular shoulder 108b to the outer or cable end 108c.

To operate the cable lock 130, the lock plate 132 is first displaced laterally to the left (viewing FIG. 10) so that the circular opening 146 is in registry with the base member opening 150. The compression of the springs 142 hold the lock plate in position. Next, the optical fiber cable with the connector cable clamp 108 in place is inserted, optical fiber end first, through the aligned openings until the cable clamp annular shoulder 108b abuts the sleeve annular shoulder 156. Again, it is important that the two shoulders 108b and 156 are properly abutted, since if they are not the length of the severed optical fiber may be adversely affected. At this point the optical fiber extends from the right side of the sleeve opening 154 and the cable clamp 108 is completely contained within the base member annular opening 150 with the fiber optic cable 110 extending from the left side of the keyhole opening 145. The lock plate 132 is then displaced laterally to the right (viewing FIG. 10) thereby locking the cable clamp 108 within the base member opening 150 with the fiber optic cable extending through the slot 148.

The remainder of the severing of the optical fiber is accomplished in the same manner as was described in detail above. Once the optical fiber has been severed, the lock plate 132 is slid to the left and the connector cable clamp 108 with the extending optical fiber of the precise predetermined length required for use in the connector 100 is removed from the cable lock 130.

From the foregoing description, it can be seen that the present invention provides an apparatus for consistently severing an optical fiber to either of two precise lengths required for use in a connector assembly. The apparatus is inexpensive to construct and relatively simple to operate under field conditions. It will be recognized by those skilled in the art that changes may be made to the above-described embodiments of the invention without departing from the broad inventive concepts thereof. For example, pair of flat cutters may be employed as a scoring means or the fiber clamp, lever clamp or cable lock may be of a different design. It is understood, therefore, that this invention is not limited to the particular embodiments disclosed, but it is intended to cover all modifications which are within the scope and spirit of the invention as defined by the appended claims.

What is claimed is:

1. An apparatus for severing an optical fiber for use in a connector assembly said assembly having a component for retaining the optical fiber against axial displacement comprising:
   a first clamp means for the connector assembly component having an abutment to position the connector assembly component with the optical fiber projecting axially therefrom;
   a second clamp means spaced from said first clamp means and disposed in axial alignment with the connector assembly component when positioned in said first clamp means for clamping the projecting optical fiber, said spacing of said first and second clamp means providing a free, unimpeded space to permit the optical fiber to span in a straight path axially from said connector assembly component to said second clamp means;
   means mounting said first and second clamp means for relative displacement in a direction axially of said optical fiber between closed and extended positions;
   bias means for urging said first and second clamp means toward said extended position to thereby apply axial tension to said optical fiber; and
   first scoring means disposed between said first and second clamp means at a first predetermined distance from said first clamp means for scoring the optical fiber to produce a break therein at said first predetermined distance from said first clamp means when said optical fiber is subjected to axial tension.

2. The apparatus as recited in claim 1 further comprising second scoring means disposed between said first and second clamp means at a second predetermined distance from said first clamp means for scoring the optical fiber to produce a break therein at said second predetermined distance from said first clamp means when said optical fiber is subjected to axial tension, said first and said second scoring means being alternatively operable to score the optical fiber.

3. An apparatus for severing an optical fiber for use in a connector assembly having a connector assembly component for clamping the optical fiber against axial displacement comprising:
   a base member;
   a first clamp means fixedly disposed at a first longitudinal side of said base member, said first clamp means for positioning the connector assembly component with the optical fiber projecting longitudinally across said base member;
   a first elongated member longitudinally slidably disposed in said base member, said first elongated member having an initial longitudinal position relative to said first clamp means;
   a second clamp means spaced from and disposed in axial alignment with said first clamp means and fixedly disposed on said first elongated member, said second clamp means for clamping said projecting optical fiber when said first elongated member is in said initial position;
   bias means for urging said first elongated member to slide away from said first clamp means to thereby apply axial tension to the optical fiber; and
   first scoring means disposed between said first and second clamp means at a first predetermined distance from said first clamp means for scoring the optical fiber to produce a break therein at said first predetermined distance from said first clamp means when said fiber is subjected to axial tension.

4. The apparatus as recited in claim 3 further comprising second scoring means disposed between said first and second clamp means at a second predetermined distance from said first clamp means for scoring the optical fiber to produce a break therein at said second predetermined distance from said clamp means when said optical fiber is subjected to axial tension, said first and said second scoring means being selectively operable to score the optical fiber.

5. The apparatus as recited in claim 4 further comprising a second elongated member transversely displaceable in said base member wherein
   said first scoring means is secured to said second elongated member at a first transverse side of the optical fiber, and
   said second scoring means is secured to said second elongated member at the second transverse side of the optical fiber,
   said second elongated member being displaced in a first transverse direction to contact and score the optical fiber with said first scoring means and in the second transverse direction to contact and score the optical fiber with said second scoring means.

6. The apparatus as recited in claim 5 wherein
   said second elongated member includes retaining means for maintaining said first elongated member in said initial position when said second elongated member is in a central position with one of said scoring means on each transverse side of the optical fiber and with neither of said scoring means contacting the optical fiber.

7. The apparatus as recited in claim 6 wherein said retaining means comprises
   a cam surface on said second elongated member and
   a cam follower fixidly disposed on said first elongated member
   said cam follower engaging said cam surface to counteract said urging means in order to maintain said first elongated member in said initial position only when said second elongated member is in said central position, said cam follower disengaging said cam surface when said second elongated member is transversely displaced in either direction.

8. The apparatus as recited in claims 1 or 3 wherein said bias means is a coil spring.

9. The apparatus as recited in claims 2 or 4 wherein the connector comprises a plug member and a receptacle member, and the first predetermined distance is established so that when a fiber is severed utilizing said first scoring means the length of the optical fiber extending beyond the connector component is the precise length required for the plug member of the connector and the second predetermined distance is established so that when a fiber is severed utilizing said second scoring means the length of the optical fiber extending beyond the connector component is the precise length required for the receptacle member of the connector.

10. An apparatus for severing an optical fiber for use in a connector assembly having a connector assembly component for clamping the optical fiber against axial displacement comprising:

a base member;

a first clamp means fixedly disposed at a first longitudinal side of said base member, said first clamp means for positioning the connector assembly component with the optical fiber projecting longitudinally across said base member;

a support member displaceably disposed in said member, and having an initial longitudinal position relative to said first clamp means;

a second clamp means spaced from and disposed in axial alignment with said first clamp means and disposed on said displaceable support member, said second clamp means operable to clamp said projecting optical fiber when said support member is in said initial position;

bias means for urging said support member away from said first clamp means to thereby apply axial tension to the optical fiber;

first scoring means disposed between said first and second clamp means at a first predetermined distance from said first clamp means for scoring the optical fiber to produce a break therein at said first predetermined distance from said first clamp means when said fiber is subjected to axial tension, and second scoring means disposed between said first and second clamp means at a second predetermined distance from said first clamp means for scoring the optical fiber to produce a break therein at said second predetermined distance from said clamp means when said optical fiber is subjected to axial tension, said first and said second scoring means being selectively operable to score the fiber.

* * * * *